(12) United States Patent
Ogawa et al.

(10) Patent No.: US 9,143,685 B2
(45) Date of Patent: Sep. 22, 2015

(54) IMAGE STABILIZATION DEVICE, IMAGE STABILIZATION METHOD, AND PROGRAM

(75) Inventors: Nobuhiro Ogawa, Tokyo (JP); Tatsumi Sakaguchi, Kanagawa (JP); Shinji Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 968 days.

(21) Appl. No.: 13/114,576

(22) Filed: May 24, 2011

(65) Prior Publication Data

US 2011/0298937 A1  Dec. 8, 2011

(30) Foreign Application Priority Data

Jun. 7, 2010  (JP) ................................. 2010-130437

(51) Int. Cl.
*H04N 5/232* (2006.01)
(52) U.S. Cl.
CPC ....... *H04N 5/23254* (2013.01); *H04N 5/23258* (2013.01); *H04N 5/23267* (2013.01)
(58) Field of Classification Search
CPC .......... H04N 5/23248; H04N 5/23254; H04N 5/23251; H04N 5/23261
USPC ............................................ 348/208.3, 208.6
See application file for complete search history.

(56) References Cited

U.S. PATENT DOCUMENTS

2007/0115364 A1* 5/2007 Kumaki ................... 348/208.99

FOREIGN PATENT DOCUMENTS

JP   2000-221954    8/2000

OTHER PUBLICATIONS

U.S. Appl. 13/038,560, filed Mar. 2, 2011, Ogawa.
U.S. Appl. No. 13/111,326, filed May 19, 2011, Watanabe, et al.

* cited by examiner

*Primary Examiner* — Nelson D. Hernández Hernández
(74) *Attorney, Agent, or Firm* — Sony Corporation

(57) ABSTRACT

Provided is an image stabilization device including a motion sensor for detecting motion data, an image data display unit for displaying image data, a shake coefficient calculation unit for calculating a shake coefficient indicating intensity of shaking based on time-series motion data detected by the motion sensor, and a motion correction unit for performing control on the image data display unit to move the image data in a direction of cancelling the shaking in a case the shake coefficient calculated by the shake coefficient calculation unit becomes less than a predetermined first threshold.

15 Claims, 17 Drawing Sheets

EXAMPLE OF FIR FILTER HAVING LOW-PASS CHARACTERISTIC

FIG.11
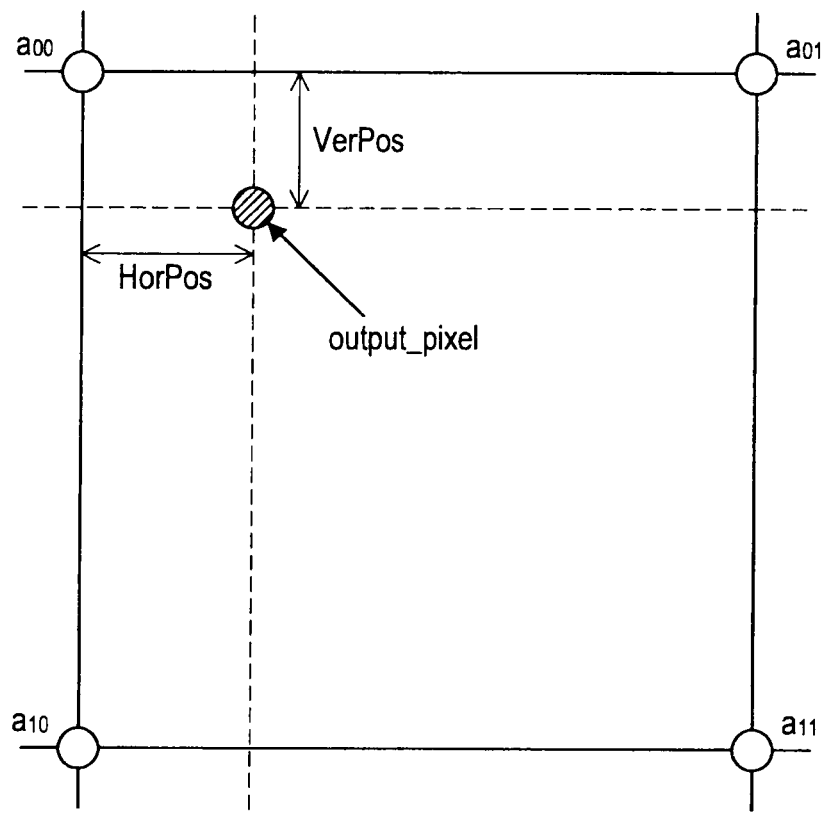
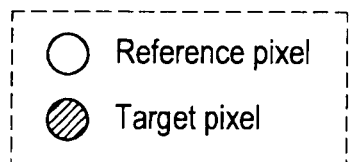
Reference pixel
Target pixel
output_pixel=($a_{00}$ (1-HorPos)+$a_{01}$ HorPos) (1-VerPos)
    +($a_{10}$ (1-VerPos)+$a_{11}$ HorPos) VerPos

FIG.14

| USE INFORMATION | FILTER STRENGTH WEIGHTING COEFFICIENT |
|---|---|
| USE 1 (FOR VIDEO) | 1 |
| USE 2 (FOR TEXTS) | 3 |
| ⋮ | ⋮ |
| USE N (FOR ATTRIBUTE INFORMATION DISPLAY) | 0 |

IMAGE STABILIZATION DEVICE, IMAGE STABILIZATION METHOD, AND PROGRAM

BACKGROUND OF THE INVENTION

1. Field of the Invention

The present invention relates to an image stabilization device, an image stabilization method, and a program.

2. Description of the Related Art

In recent years, small electronic appliances (hereinafter, portable appliances) such as mobile phones, portable game machines, portable information terminals, notebook computers (hereinafter, notebook PCs), portable music players, digital video cameras and digital still cameras (hereinafter, image capturing devices), and the like have come to be widely used. These portable appliances are used in various places. For example, users are seen to be using the portable appliances on a vehicle while moving, on a street corner, in a waiting room in an office building, in the living room at home, and the like.

As such, use scenes are becoming more various as the portable appliances are made smaller and their portability is increased. However, although the effect of increase in the portability increases the convenience of carrying, it does not increase the applicability to various use scenes. For example, although a portable appliance is small and thus is easy to carry onto a vehicle, a quick and accurate operation thereof is difficult on a bouncing vehicle. Accordingly, companies manufacturing portable appliances are refining structures of holding portions of portable appliances or the forms of operation means, for example.

Furthermore, there is also an issue that it is difficult to correctly perceive images, texts, or the like displayed on display means of a portable appliance while on a bouncing vehicle or while walking. That is, images, texts, or the like displayed on the display means are blurred due to the shaking of the portable appliance, thus making it difficult to see the displayed contents. Such blurring of images, texts, or the like is very tiring to the optic nerve of a user. Thus, a technology has been developed that moves images, texts, or the like in a direction that cancels the shaking of a portable appliance, thereby reducing the blurring of the images, texts, or the like.

With respect to the technology above, JP 2000-221954A discloses a technology for detecting shaking of a portable appliance and moving a display image in a direction that cancels the shaking. The patent document also discloses a technology for truncating a region not displayed on the screen when the display image is moved. Furthermore, the patent document discloses a technology for detecting shaking of the portable appliance by using an accelerometer. The technology disclosed in the patent document here is for calculating shaking of a phase opposite to the phase of the shaking of a portable appliance and adding this shaking to the display image to cancel the shaking of the portable appliance.

SUMMARY OF THE INVENTION

However, a delay occurs between the timing of occurrence of shaking of a portable appliance and the timing of motion compensation of a display image due to computational processing or the like. Thus, in the case the shaking of the portable appliance is weak, the phase of the shaking of the portable appliance and the phase of shaking given to the display image will be approximately opposite, but in the case the shaking of the portable appliance is intense, the phases of the shaking will not be opposite. In some cases, the phases of the shaking are intensified by each other. As a result, shaking of the display image relative to the user's gaze point is increased and will be even more tiring to the optic nerve of the user.

For example, when using the portable appliance on a bouncing vehicle, a fine shaking is likely to occur on the portable appliance. Accordingly, if the technology of the patent document described above is applied, discrepancy between phases will occur frequently between the shaking of the portable appliance and the shaking given to the display image to cancel the above-mentioned shaking, and thus the shaking of the display image relative to the user's gaze point will be even more increased. Furthermore, eyes of a human have a function of following the motion of a viewing target. Thus, even if the display image is not completely still relative to the user's gaze point, the display image can be correctly viewed.

In light of the foregoing, it is desirable to provide an image stabilization device, an image stabilization method, and a program which are novel and improved, and which are capable of reducing shaking of a display image relative to a user's gaze point in the case shaking of a portable appliance occurs, thereby reducing the fatigue of the user.

According to an embodiment of the present invention, there is provided an image stabilization device which includes a motion sensor for detecting motion data, an image data display unit for displaying image data, a shake coefficient calculation unit for calculating a shake coefficient indicating intensity of shaking based on time-series motion data detected by the motion sensor, and a motion correction unit for performing control on the image data display unit, in a case the shake coefficient calculated by the shake coefficient calculation unit becomes less than a predetermined first threshold, to move the image data in a direction of cancelling the shaking.

The motion correction unit may end the control of moving the image data in the direction of cancelling the shaking in a case the shake coefficient calculated by the shake coefficient calculation unit becomes less than a predetermined second threshold that is less than the predetermined first threshold.

The motion correction unit may perform control of moving the image data in such a way that a degree of cancellation of the shaking gradually increases as the shake coefficient becomes less than the predetermined first threshold, and may perform control of moving the image data in such a way that the degree of cancellation of the shaking gradually decreases as the shake coefficient nears the predetermined second threshold.

The image stabilization device may further include a motion estimation unit for estimating, from motion data detected by the motion sensor at present and in a past, motion data to be detected at a next time point, and a cancellation degree determination unit for determining a degree of cancellation of the shaking based on the motion data estimated by the motion estimation unit. In this case, the motion correction unit performs control of moving the image data according to the degree of cancellation of the shaking determined by the cancellation degree determination unit.

The motion correction unit may perform control of moving the image data within a range allowing display of a protected area set in the image data.

The image stabilization device may further include a maximum movement amount calculation unit for calculating a maximum movement amount of the image data based on a relationship between a frame position of a display screen on which the image data is displayed and a frame position of the protected area. In this case, the motion correction unit performs control of moving the image data within a range that does not exceed the maximum movement amount calculated by the maximum movement amount calculation unit.

The image data may be formed from a plurality of layers. A different use may be set for each layer. A different degree of cancellation of the shaking may be set for each use. In this case, the motion correction unit performs control of moving each layer forming the image data according to the degree of cancellation of the shaking set for the use of each layer.

In a case a predetermined time has elapsed in a state where the shake coefficient calculated by the shake coefficient calculation unit is less than the predetermined first threshold, the motion correction unit may perform the control of moving the image data in the direction of cancelling the shaking after performing scaling on the image data.

According to another embodiment of the present invention, there is provided an image stabilization method which includes the steps of detecting motion data, displaying image data, calculating a shake coefficient indicating intensity of shaking based on time-series motion data detected in the step of detecting, and moving the image data displayed in the step of displaying in a direction of cancelling the shaking in a case the shake coefficient calculated in the step of calculating becomes less than a predetermined first threshold.

According to another embodiment of the present invention, there is provided a program for causing a computer to realize a motion sensor function of detecting motion data, an image data display function of displaying image data, a shake coefficient calculation function of calculating a shake coefficient indicating intensity of shaking based on time-series motion data detected by the motion sensor function, and a motion correction function of performing, in relation to the image data display function, control of moving the image data in a direction of cancelling the shaking in a case the shake coefficient calculated by the shake coefficient calculation function becomes less than a predetermined first threshold.

According to another embodiment of the present invention, there is provided a computer-readable recording medium in which the program is recorded.

According to the embodiments of the present invention described above, it is possible to reduce shaking of a display image relative to a user's gaze point in the case shaking of a portable appliance occurs, thereby reducing the fatigue of the user.

BRIEF DESCRIPTION OF THE DRAWINGS

FIG. 11 is an explanatory diagram for describing a motion compensation method according to the embodiment;

FIG. 14 is an explanatory diagram for describing a determination method of filter strength according to the embodiment;

DETAILED DESCRIPTION OF THE EMBODIMENT(S)

Figure 1:
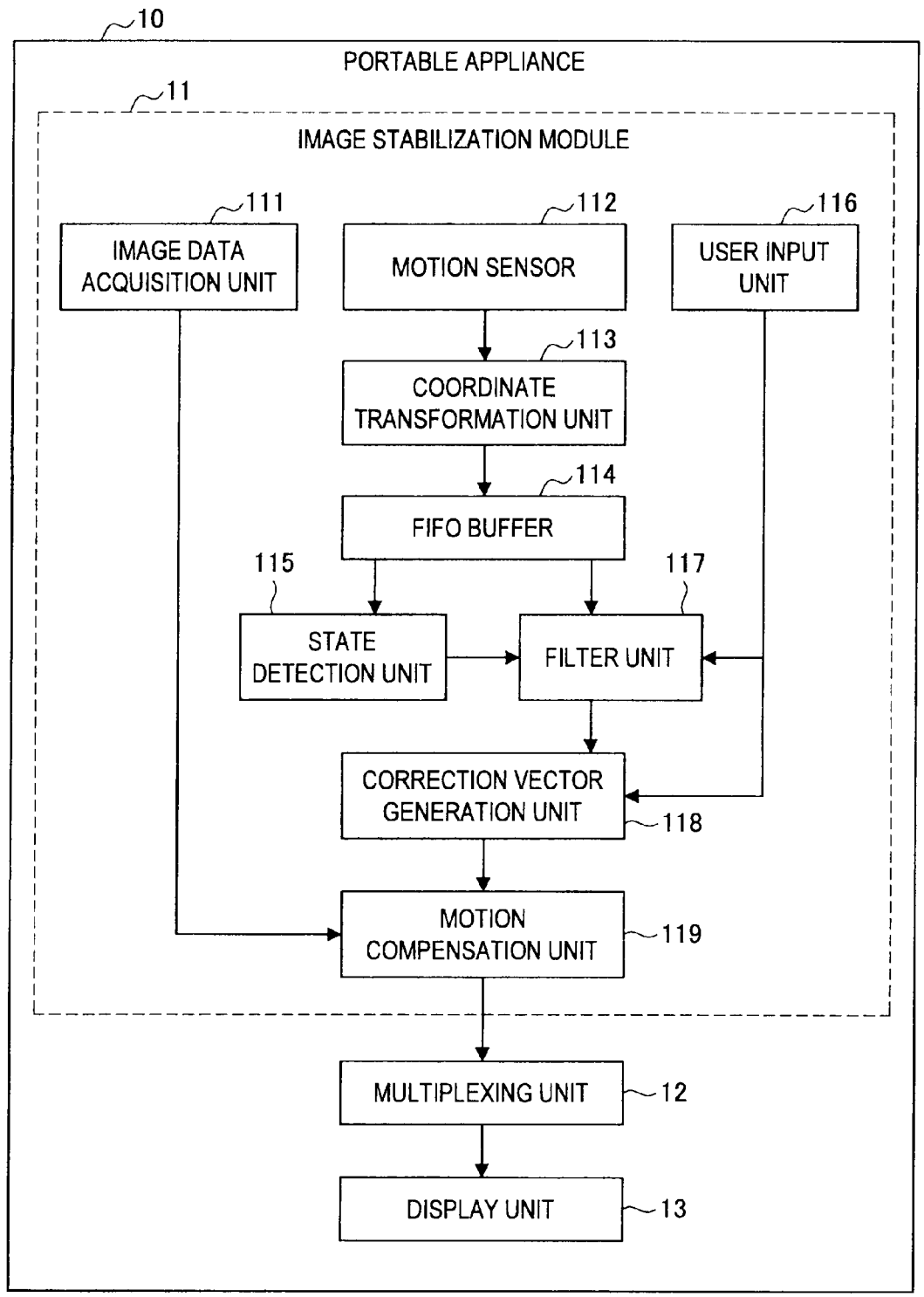
FIG. 1 is an explanatory diagram for describing a functional configuration of a portable appliance according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of Description]

The flow of description of embodiments of the present invention described below will be briefly mentioned here.

First, a functional configuration of a portable appliance 10 according to a first embodiment of the present invention will be described with reference to FIG. 1. Next, an operation of a state detection unit 115 according to the embodiment will be described with reference to FIG. 2. Then, a calculation method of applied cancellation strength according to the embodiment will be described with reference to FIGS. 3 and 4.

Next, an operation of a filter unit 117 according to the embodiment will be described with reference to FIG. 5. Then, a calculation method of a correction amount used at the time of application of shake cancelling according to the embodiment will be described with reference to FIGS. 6 and 7. At this time, an example of a filter used at the time of application of the shake cancelling according to the embodiment will be described with reference to FIG. 8.

Figure 9:
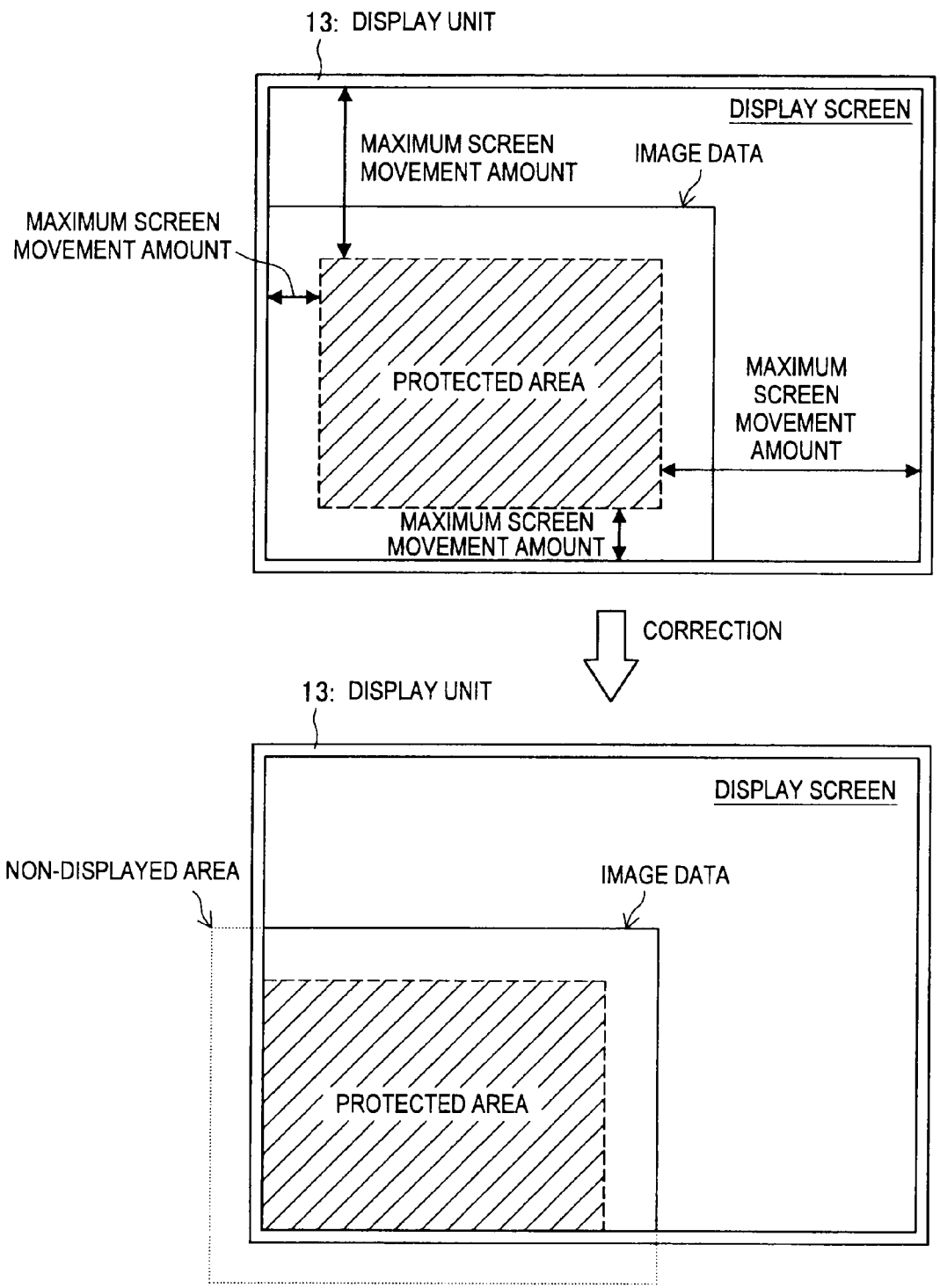
FIG. 9 is an explanatory diagram for describing a method of setting a protected area and a maximum screen movement amount that are taken into account at the time of application of shake cancelling according to embodiment.

Next, a method of setting a protected area and a maximum screen movement amount that are taken into account at the time of application of shake cancelling according to embodiment will be described with reference to FIGS. 9 and 10. Also, a motion compensation method according to the embodiment will be described with reference to FIG. 11. Furthermore, a layer multiplexing method according to the embodiment will be described with reference to FIG. 12.

Next, a functional configuration of a portable appliance 10 according to a second embodiment of the present invention will be described with reference to FIG. 13. Then, a determination method of filter strength according to the embodiment will be described with reference to FIG. 14. Then, a functional configuration of a portable appliance 10 according to a third embodiment of the present invention will be described with reference to FIG. 15. Then, an application method of shake cancelling according to the embodiment will be described with reference to FIG. 16.

Then, a configuration of hardware capable of realizing the functions of the portable appliances 10 according to the first to third embodiments of the present invention will be described with reference to FIG. 17. Lastly, the technical idea of the present embodiment will be summarized and operational effects obtained by the technical idea will be briefly described.

(Description Items)
1: First Embodiment
   1-1: Functional Configuration of Portable Appliance 10
   1-2: Operation of State Detection Unit 115
      1-2-1: Flow of Processes
      1-2-2: Calculation Method of Shake Coefficient
      1-2-3: Calculation Method of Applied Cancellation Strength
   1-3: Operation of Filter Unit 117
      1-3-1: Flow of Processes
      1-3-2: Calculation of Prediction Value
      1-3-3: Calculation of Correction Amount
      1-3-4: Determination Method of Protected Area and Maximum Screen Movement Amount
2: Second Embodiment
   2-1: Functional Configuration of Portable Appliance 10
   2-2: Determination Method of Filter Strength
3: Third Embodiment
   3-1: Functional Configuration of Portable Appliance 10
4: Hardware Configuration
5: Summary 1: First Embodiment A first embodiment of the present invention will be described. The present embodiment relates to a method of reducing shaking of a display image occurring relative to a user's gaze point in a situation where shaking is caused on a portable appliance 10. Note that this method is not for "stilling" a display image relative to a user's gaze point, but for "reducing" the shaking of the display image so as to reduce the fatigue of the user.

[1-1: Functional Configuration of Portable Appliance 10]

First, a functional configuration of the portable appliance 10 according to the present embodiment will be described with reference to FIG. 1. FIG. 1 is an explanatory diagram for describing a functional configuration of the portable appliance 10 according to the present embodiment.

As shown in FIG. 1, the portable appliance 10 mainly includes an image stabilization module 11, a multiplexing unit 12, and a display unit 13. The image stabilization module 11 is means for reducing shaking of a display image relative to a user's gaze point. The multiplexing unit 12 is means for multiplexing a plurality of layers and creating a display image. The display unit 13 is means for displaying the display image created by the multiplexing unit 12. The feature of the portable appliance 10 according to the present embodiment lies mainly in the configuration of the image stabilization module 11. Thus, in the following, the configuration of the image stabilization module 11 will be described in greater detail.

As shown in FIG. 1, the image stabilization module 11 mainly includes an image data acquisition unit 111, a motion sensor 112, a coordinate transformation unit 113, a FIFO buffer 114, and a state detection unit 115. Furthermore, the image stabilization module 11 includes a user input unit 116, a filter unit 117, a correction vector generation unit 118, and a motion compensation unit 119.

(Image Data Acquisition Unit 111)

The image data acquisition unit 111 is means for acquiring image data. For example, the image data acquisition unit 111 acquires a time-series frame group. Incidentally, frames forming this frame group may be placed at constant time intervals (fixed frame intervals) or may be placed at arbitrary time intervals (variable frame intervals). Also, each frame is configured from a plurality of layers.

Additionally, a number indicating the position in an overlaying order and use information are associated with each layer. For example, a number 0 is associated with the top layer, and a number 1 is associated with the next layer. Also, the use information is for specifying the use of an image displayed on a layer, such as a menu screen, a video screen, an operation object, or the like. Image data acquired by the image data acquisition unit 111 is input to the motion compensation unit 119. In the following explanation, each frame or each layer may be sometimes called image data.

(Motion Sensor 112)

The motion sensor 112 is means for detecting the motion of the portable appliance 10. For example, the motion sensor 112 is configured from a six-axis sensor, a two-axis sensor, or the like. Additionally, the six-axis sensor is a sensor capable of detecting acceleration along three orthogonal axis directions and rotation around three orthogonal axes. Also, the two-axis sensor is a sensor capable of detecting acceleration along two orthogonal axis directions. In the following explanation, data showing motion detected by the motion sensor 112 will be called motion data.

The motion sensor 112 outputs the motion data at a predetermined sampling cycle. This sampling cycle is not related to the frame rate of the image data. Also, this sampling rate may be a fixed rate or may be a variable rate. However, according to the sampling theorem, a sampling rate two times or more the frequency for moving the image data to cancel the shaking of the portable appliance 10 will be necessary. Also, the motion data output from the motion sensor 112 is input to the coordinate transformation unit 113.

(Coordinate Transformation Unit 113)

The coordinate transformation unit 113 is means for transforming the motion data input from the motion sensor 112 into a data format that can be used by the filter unit 117 in the latter stage. For example, in the case the motion sensor 112 is a six-axis sensor, motion data including gravitational acceleration is obtained. That is, the motion data input to the coordinate transformation unit 113 is not motion data purely expressing the motion of the portable appliance 10. Accordingly, the coordinate transformation unit 113 removes the component of the gravitational acceleration from the motion data input from the motion sensor 112, and generates motion data expressing the motion of the portable appliance 10. The motion data generated by the coordinate transformation unit 113 is input to the FIFO buffer 114.

(FIFO Buffer 114)

The FIFO buffer 114 is means for accumulating the motion data input by the coordinate transformation unit 113. Additionally, when the next motion data is input in a state where a predetermined accumulation amount is full, the FIFO buffer 114 discards the oldest motion data. This accumulation amount is set to a data amount for one second (for example, thirty frames in the case the frame rate is 30 fps), for example. The motion data accumulated in the FIFO buffer 114 is read by the state detection unit 115 and the filter unit 117.

(State Detection Unit 115)

The state detection unit 115 is means for calculating applied cancellation strength. Additionally, the applied cancellation strength here is a value indicating the strength of cancellation of the shaking of image data relative to a user's gaze point. First, the state detection unit 115 acquires motion data $(D_t, \ldots, D_{t+n})$ from the FIFO buffer 114. Additionally, $D_t$ is motion data detected at time t. The state detection unit 115 which has acquired the motion data $(D_t, \ldots, D_{t+n})$ inputs the motion data $(D_t, \ldots, D_{t+n})$ to a predetermined function f and calculates a shake coefficient s, as shown in formula (1) below.

[Equation 1]

$$s = f(D_t, \ldots, D_{t+n}) \quad (1)$$

This function f is a transformation formula for quantifying the intensity of the motion expressed by the motion data $(D_t, \ldots, D_{t+n})$. Also, the shake coefficient s is a numerical value expressing the intensity of the motion expressed by the motion data $(D_t, \ldots, D_{t+n})$. For example, the above-described function f is a transformation formula for orthogonally transforming the motion data $(D_t, \ldots, D_{t+n})$ and outputting a maximum amplitude value in a predetermined frequency domain. Additionally, as an example of the orthogonal transformation, Fourier transform or the like may be taken.

Figure 3:
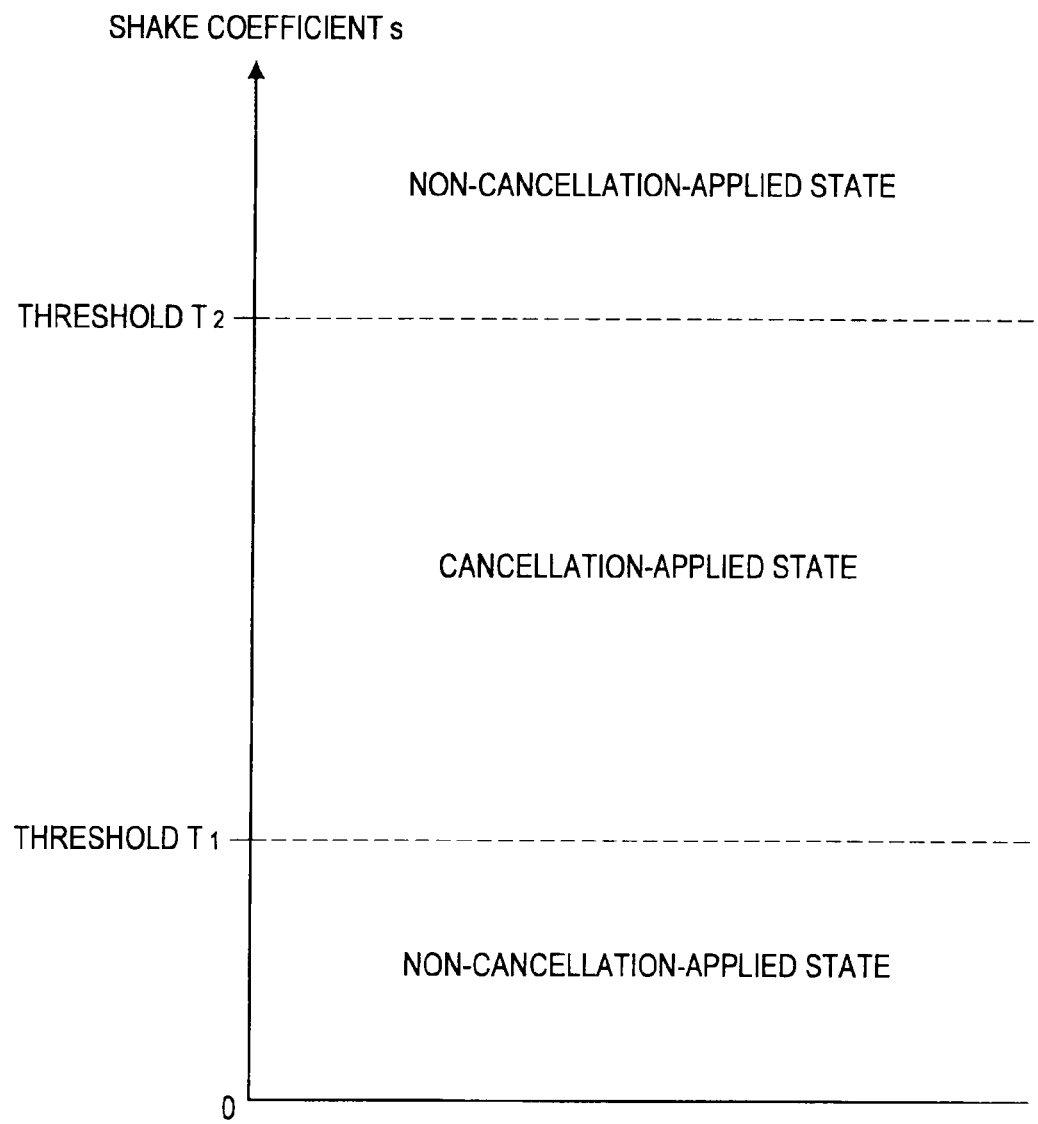
FIG. 3 is an explanatory diagram for describing a calculation method of applied cancellation strength according to the embodiment.

The state detection unit 115 which has calculated the shake coefficient s in the above manner calculates applied cancellation strength based on the shake coefficient s. For example, in the case only two states, namely a case where cancellation is to be applied and a case where cancellation is not to be applied, are to be taken into account, the state detection unit 115 calculates the applied cancellation strength based on comparison results between the shake coefficient s and two thresholds $T_1$ and $T_2$, as shown in FIG. 3. Additionally, the applied cancellation strength is 1.0 in the case of a cancellation-applied state. On the other hand, the applied cancellation strength is 0.0 in the case of a non-cancellation-applied state.

As described above, a case where the shake coefficient s is large is a state where the shaking of the portable appliance 10 is intense. In the case the shaking of the portable appliance 10 is intense, if image data is moved in a direction of cancelling the shaking, the shaking of the image data relative to a user's gaze point is not reduced, but on the contrary, the shaking of the image data relative to the user's gaze point is possibly increased. Furthermore, if the image data is greatly moved, much of the image area will move out of the screen and a non-displayed area of the image data will be too large. Thus, it is assumed preferable that cancellation of shaking is not applied in the case the shaking of the portable appliance 10 is intense.

On the other hand, a case where the shake coefficient s is small is a state where the shaking of the portable appliance 10 is slow. In the case the shaking of the portable appliance 10 is slow, a user can follow the motion of the image data without becoming tired. Thus, no cancellation is necessary in the case the shake coefficient s is small.

For the above reason, thresholds $T_1$ and $T_2$ are preferably determined as follows. For example, threshold $T_1$ is preferably determined such that the range of the shaking indicated by the shake coefficient s will be about 1% of the screen size.

That is, threshold $T_1$ is preferably determined such that the shaking of the image data relative to the user's gaze point will be a negligible value. On the other hand, with respect to threshold $T_2$, the range of the shaking indicated by the shake coefficient s is preferably about 10% of the screen size. That is, it is preferably determined to be a value according to which, in the case cancellation has been applied, the effect of cancellation is obtained and the non-displayed area is not too large.

Additionally, the numerical values of thresholds $T_1$ and $T_2$ are not limited to the examples described above. Also, thresholds $T_1$ and $T_2$ may be fixed values, or they may be variable.

The determination method of the applied cancellation strength described above takes into account only two states, namely a state where cancellation is to be applied and a state where cancellation is not to be applied. In contrast, a method of successively determining the applied cancellation strengths according to the shake coefficients s is also conceivable.

Figure 4:
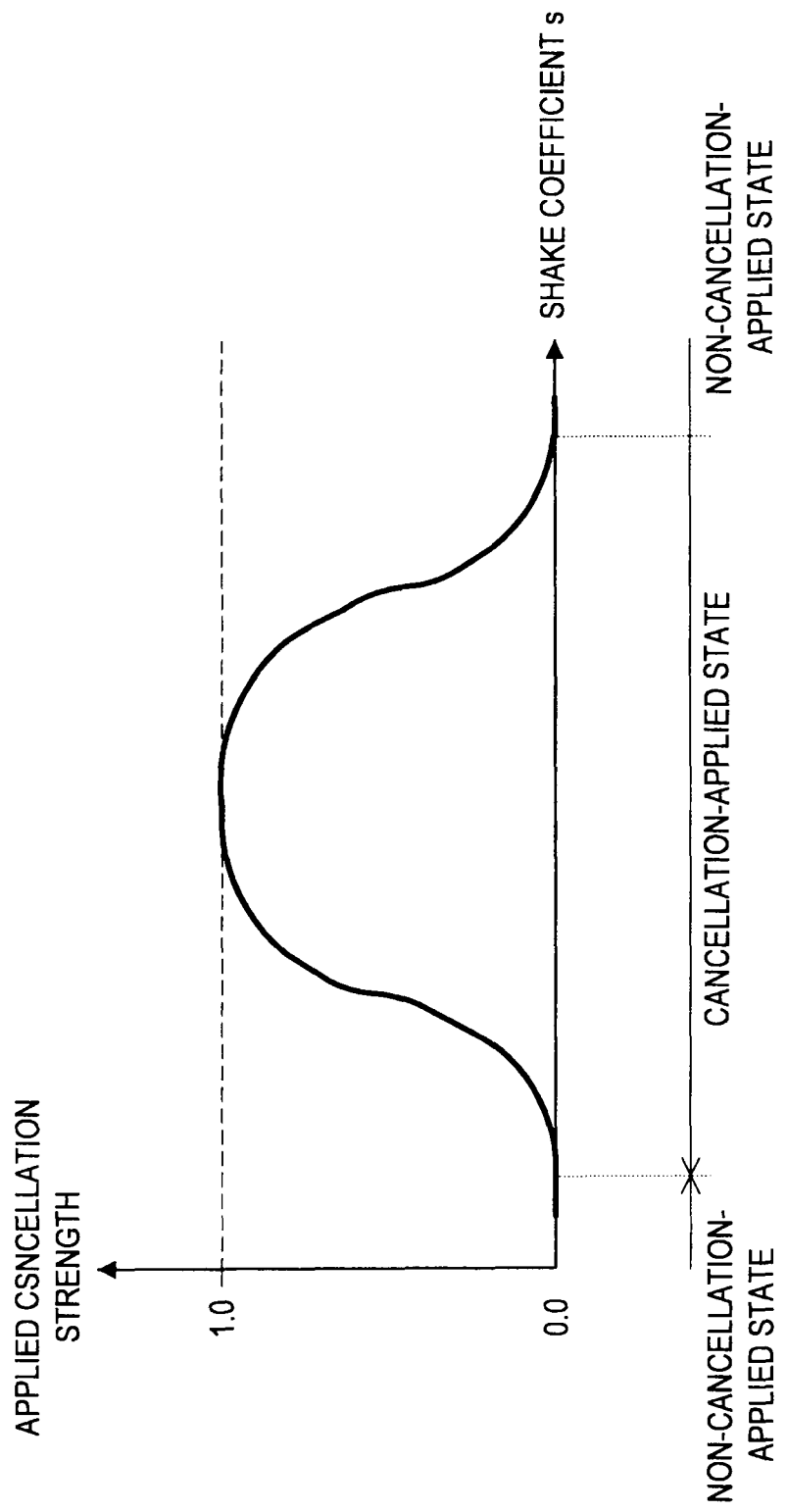
FIG. 4 is an explanatory diagram for describing a calculation method of the applied cancellation strength according to the embodiment.

For example, the applied cancellation strength can be defined by a real number between 0.0 and 1.0, as shown in FIG. 4. In this case, the non-cancellation-applied state is defined to be a state where the applied cancellation strength is 0.0. Furthermore, the characteristic of the applied cancellation strength is expressed by a curved line as shown in FIG. 4 or other curved lines or linear lines. Of course, the form of the characteristic curve determining the applied cancellation strength according to the shake coefficient s is not limited to the example in FIG. 4. Additionally, in the following, an explanation will be given assuming a case where applied cancellation strength defined by successive values is used.

As described above, the state detection unit 115 calculates the shake coefficient s for each axis of the motion sensor 112 by using the motion data $(D_t, \ldots, D_{t+n})$ read from the FIFO buffer 114, and calculates the applied cancellation strength based on the shake coefficient s. The applied cancellation strength calculated by the state detection unit 115 in this manner is input to the filter unit 117.

(User Input Unit 116)

The user input unit 116 is means for a user to input various types of data.

(Filter Unit 117)

The filter unit 117 is means for calculating the amount by which image data is to be moved to cancel the shaking of the image data relative to a user's gaze point (hereinafter, correction amount). First, the filter unit 117 reads the motion data $(D_t, \ldots, D_{t+n})$ from the FIFO buffer 114, and calculates motion data $D_{t+n+1}$ at a display time point t+n+1 of a next frame. At this time, the motion data $D_{t+n+1}$ (prediction value) is calculated for each axis of the motion sensor 112.

Figure 6:
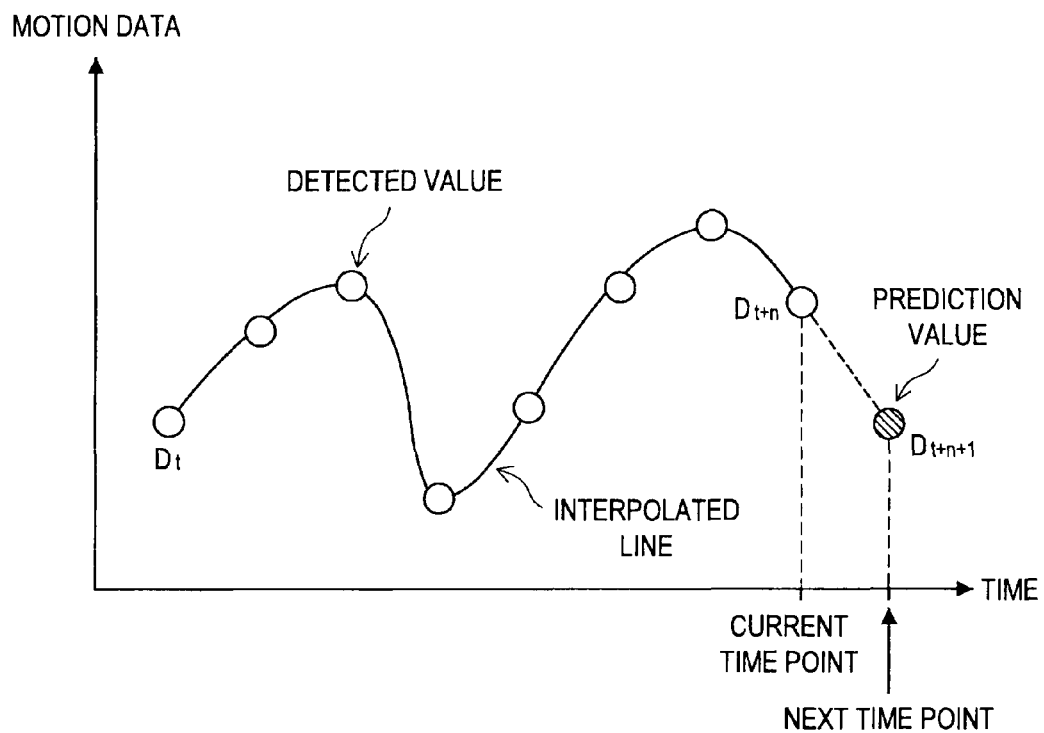
FIG. 6 is an explanatory diagram for describing a calculation method of a correction amount used at the time of application of shake cancelling according to the embodiment.

Additionally, the calculation method of the motion data $D_{t+n+1}$ may be a linear prediction method using two adjacent samples $(D_{t+n-1}, D_{t+n})$ as shown in FIG. 6 or a prediction method using a spline curve of the motion data $(D_t, \ldots, D_{t+n})$, for example.

Then, the filter unit 117 applies motion data $(D_t, \ldots, D_{t+n}, D_{t+n+1})$ including a prediction value to a predetermined filter. As this filter, a filter having a low-pass characteristic or a band-pass characteristic, such as an averaging filter, a bilateral filter or the like, can be used. For example, a FIR filter shown in FIG. 8 can be used. Additionally, the filter unit 117 changes the tap length of the filter according to the applied cancellation strength input by the state detection unit 115 or according to filter strength input by a user via the user input unit 116.

For example, in the case the applied cancellation strength is strong, the filter unit 117 increases the tap length of the filter.

On the other hand, in the case the applied cancellation strength is weak, the filter unit 117 reduces the tap length of the filter. Also, in the case the filter strength input by a user is strong, the filter unit 117 increases the tap length of the filter. On the other hand, in the case the filter strength input by the user is weak, the filter unit 117 reduces the tap length of the filter. For example, the filter unit 117 decides a standard tap length to be thirty samples or the like, and increases or reduces, according to the applied cancellation strength, the tap length in relation to the standard tap length.

Figure 7:
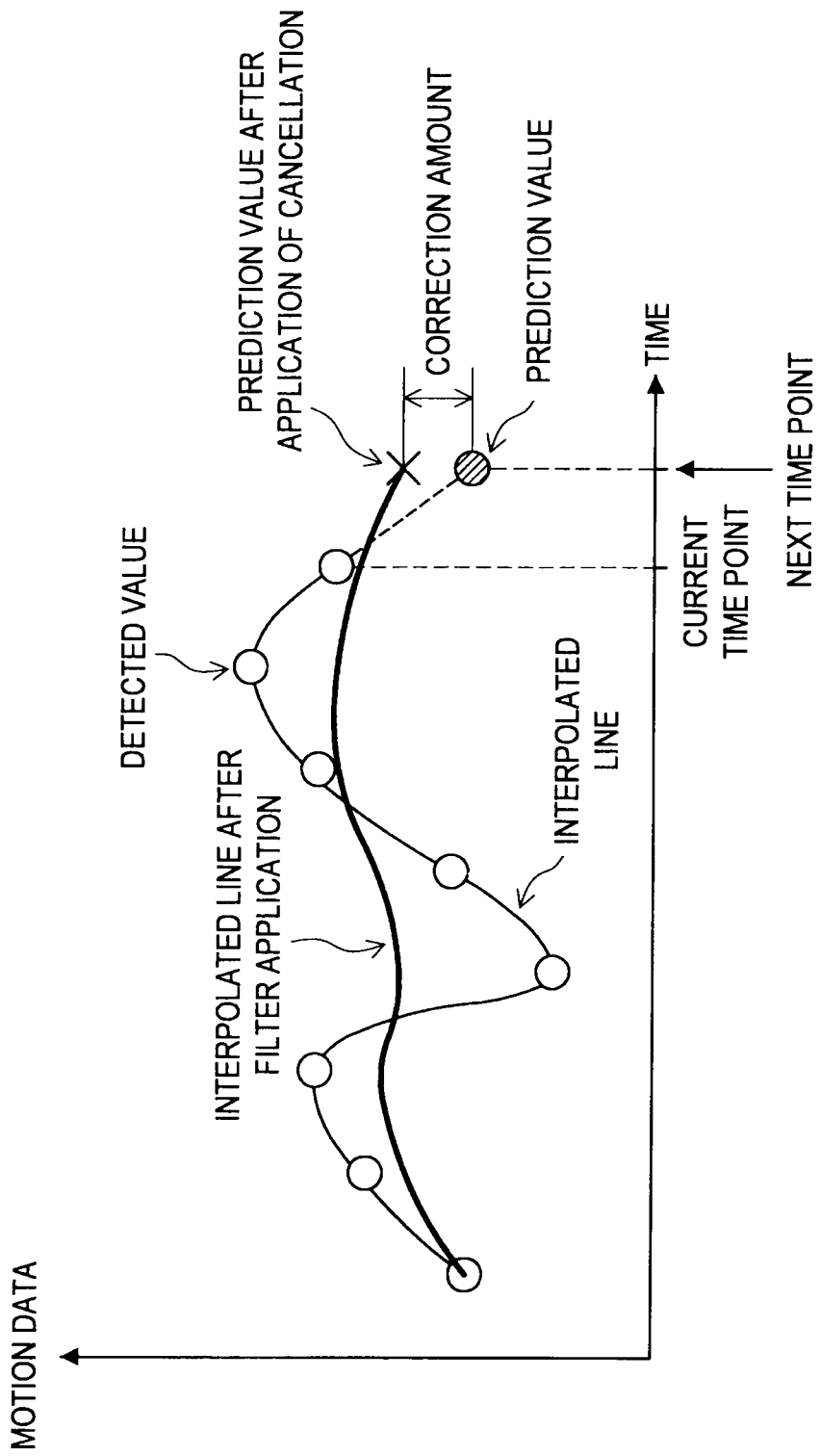
FIG. 7 is an explanatory diagram for describing a calculation method of a correction amount used at the time of application of shake cancelling according to the embodiment.
Figure 8:
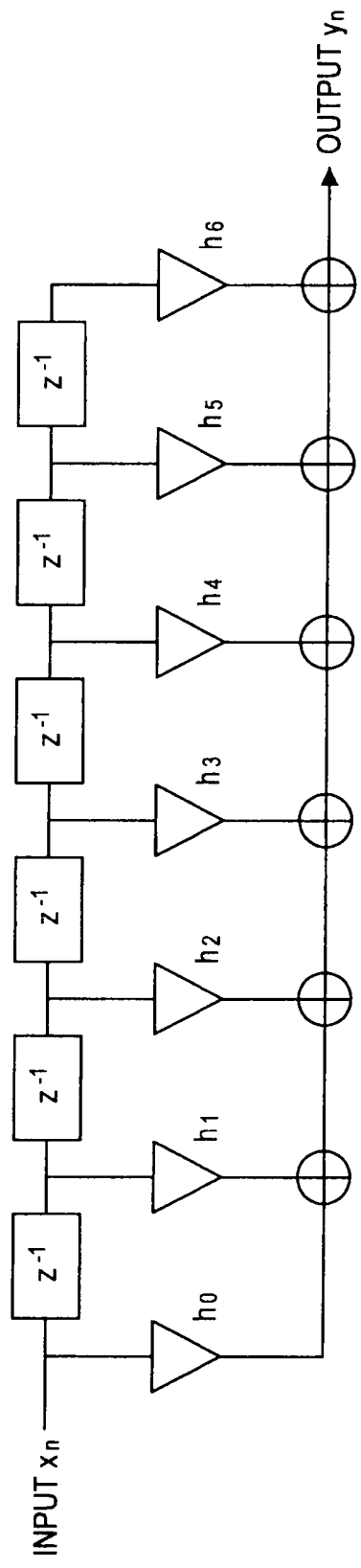
FIG. 8 is an explanatory diagram showing an example circuit configuration of a FIR filter.

The output value of the filter to which the motion data ($D_t, \ldots, D_{t+n}, D_{t+n+1}$) including a prediction value has been applied will be as the interpolated line after filter application shown in FIG. 7. Additionally, in the following explanation, the values on the interpolated line after filter application will be referred to as filter applied data. The filter unit 117 which has obtained the filter applied data sets the difference between the filter applied data at the display time point t+n+1 of a next frame and prediction value $D_{t+n+1}$ as the correction amount. Also, the filter unit 117 converts the unit of the correction amount from the unit of motion data (inch or the like) to the unit of image data (pixel). Correction amount for each axis is obtained in the unit of image data in this manner.

Next, the filter unit 117 calculates a maximum value of distance image data can move on the screen (hereinafter, maximum screen movement amount). As shown in FIG. 9, for example, the maximum screen movement amount is calculated from the relationship between a protected area set for the image data and the position of an image frame. The protected area is an area set in advance as an area in the image data that is definitely to be displayed. In this case, the maximum screen movement amount is determined according to a distance between the boundary of the protected area and the image frame.

After calculating the maximum screen movement amount in the manner described above, the filter unit 117 compares the correction amount and the maximum screen movement amount with respect to the direction of each axis. Then, in the case the correction amount is larger than the maximum screen movement amount, the filter unit 117 re-sets the correction amount so that the correction amount will be the maximum screen movement amount. With the correction amount being re-set in this manner, the protected area will definitely be displayed within the screen even if the image data is moved based on the correction amount, as shown in FIG. 9.

Figure 10:
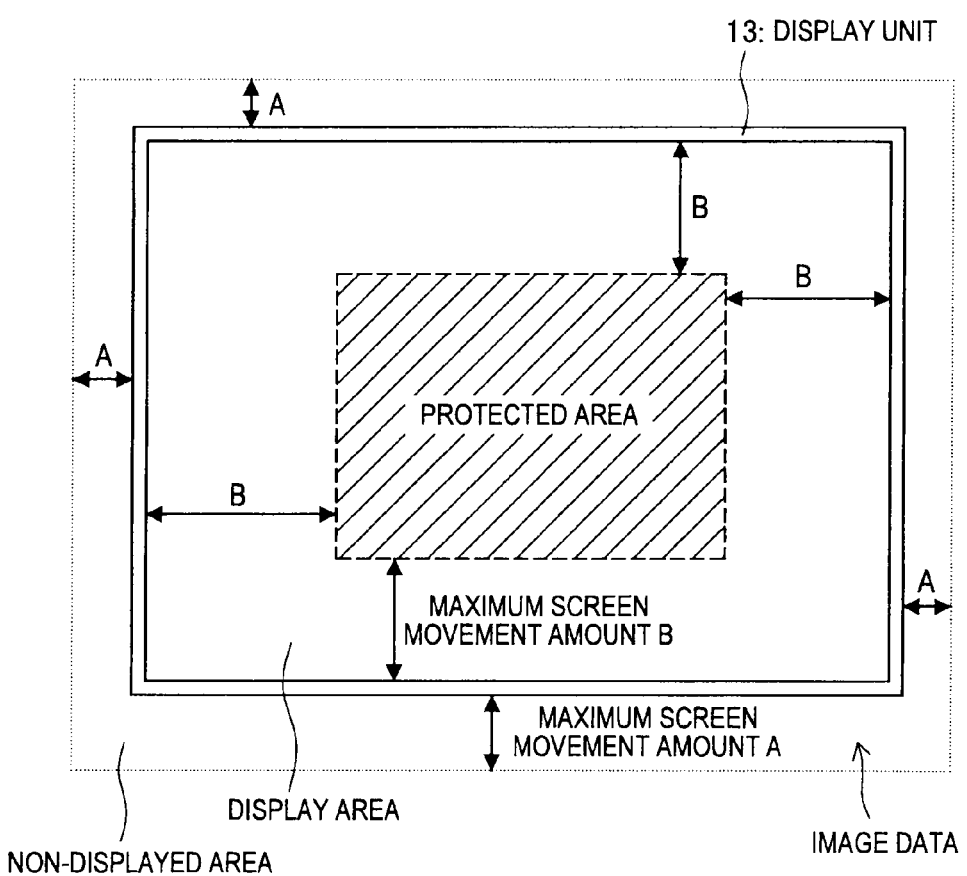
FIG. 10 is an explanatory diagram for describing a method of setting a protected area and a maximum screen movement amount that are taken into account at the time of application of shake cancelling according to embodiment.

Additionally, as shown in FIG. 10, the filter unit 117 may set the maximum screen movement amount such that the image data is displayed on the entire screen without fail. The image data illustrated in FIG. 10 is larger than the screen size. In this case, the image data is displayed on the entire screen even if the image data is moved by maximum screen movement amount A shown in FIG. 10. That is, to have the image data displayed on the entire screen without fail, the maximum screen movement amount can be set as the maximum screen movement amount A shown in FIG. 10. On the other hand, to have the protected area displayed without fail, the maximum screen movement amount may be set as maximum screen movement amount B shown in FIG. 10.

As described above, the correction amount calculated by the filter unit 117 or the correction amount re-set based on the maximum screen movement amount is input to the correction vector generation unit 118. Incidentally, in the above explanation, expressions, correction amount of image data and maximum screen movement amount of image data, are used, but the processing described above is performed for each layer. That is, the protected area is set for each layer or the maximum screen movement amount is calculated for each layer, and the correction amount is set for each layer. Then, the correction amount set for each layer is input from the filter unit 117 to the correction vector generation unit 118.

(Correction Vector Generation Unit 118, Motion Compensation Unit 119)

The correction vector generation unit 118 is means for generating a correction vector for correcting the position of a layer by using a correction amount input from the filter unit 117. This correction vector is transformation means for transforming a layer before application of cancellation into a layer after application of cancellation by motion compensation. When taking the coordinate of each pixel forming the layer before application of cancellation as X and the coordinate of each pixel after application of cancellation as X', the coordinate X' is expressed by using the formulae (2) to (7) below. Incidentally, parameters ($h$, $v$, $\theta$, $p$, $h_c$, $v_c$) are parameters related to the correction amount for each axis input by the filter unit 117.

[Equation 2]

$$X' = C^{-1}P^{-1}MPCX \tag{2}$$

$$X = \begin{pmatrix} x \\ y \\ 1 \end{pmatrix} \tag{3}$$

$$X' = \begin{pmatrix} x' \\ y' \\ 1 \end{pmatrix} \tag{4}$$

$$M = \begin{pmatrix} 1 & 0 & h \\ 0 & 1 & v \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix} \tag{5}$$

$$P = \begin{pmatrix} p & 0 & 0 \\ 0 & 1 & 0 \\ 0 & 0 & 1 \end{pmatrix} \tag{6}$$

$$C = \begin{pmatrix} 1 & 0 & -h_c \\ 0 & 1 & -v_c \\ 0 & 0 & 1 \end{pmatrix} \tag{7}$$

The correction vector generation unit 118 calculates, by using formulae (2) to (7) above, the parameters ($h$, $v$, $\theta$, $p$, $h_c$, $v_c$) from the correction amount for each axis input by the filter unit 117, and inputs a correction matrix V expressed by formula (8) below to the motion compensation unit 119. The motion compensation unit 119 performs motion compensation on a layer by using the correction matrix V input by the correction vector generation unit 118. For example, as shown in FIG. 11, the motion compensation unit 119 performs motion compensation by using linear interpolation and with accuracy below an integer pixel. A layer on which motion compensation has been performed by the motion compensation unit 119 is input to the multiplexing unit 12.

[Equation 3]

$$V = C^{-1}P^{-1}MPC \tag{8}$$

Figure 12:
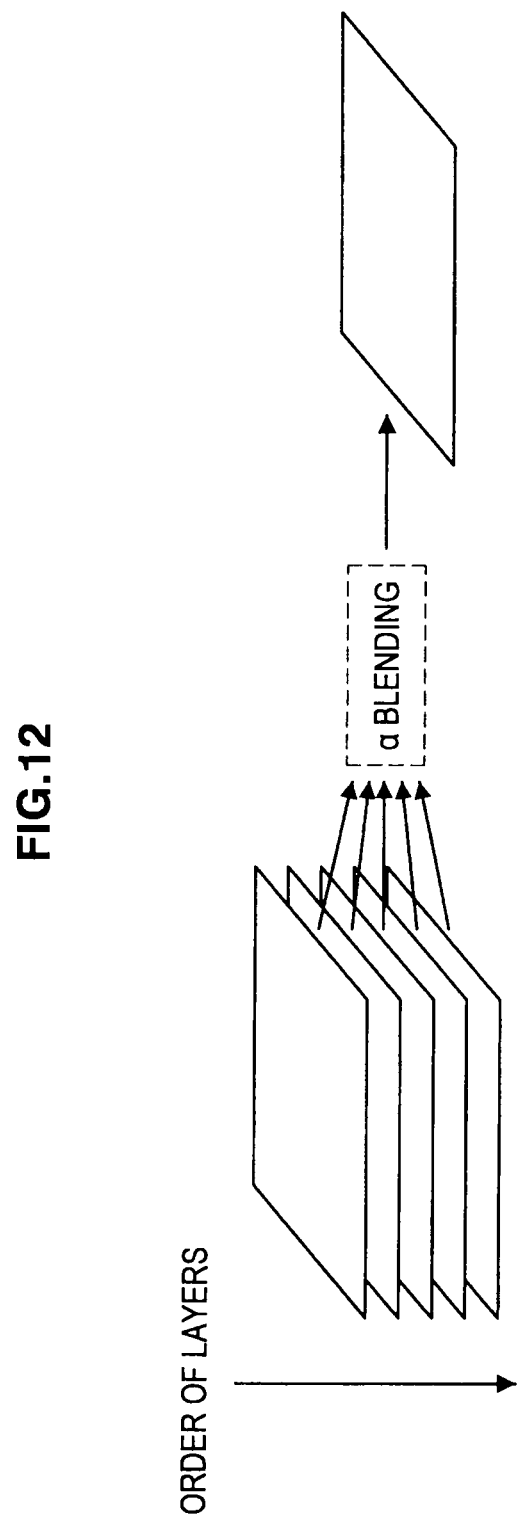
FIG. 12 is an explanatory diagram for describing a layer multiplexing method according to the embodiment.

In the foregoing, a configuration of the image stabilization module 11 has been described in detail. A layer group input from the motion compensation unit 119 to the multiplexing unit 12 is alpha blended and multiplexed into one frame, as shown in FIG. 12. Incidentally, it is assumed that an alpha value (parameter indicating transparency amount) is set for each layer on a per-pixel basis or on a per-layer basis. Then, one frame obtained by the multiplexing unit 12 is displayed on the display unit 13.

In the forgoing, the functional configuration of the portable appliance 10 according to the present embodiment has been described.

[1-2: Operation of State Detection Unit 115]

Figure 2:
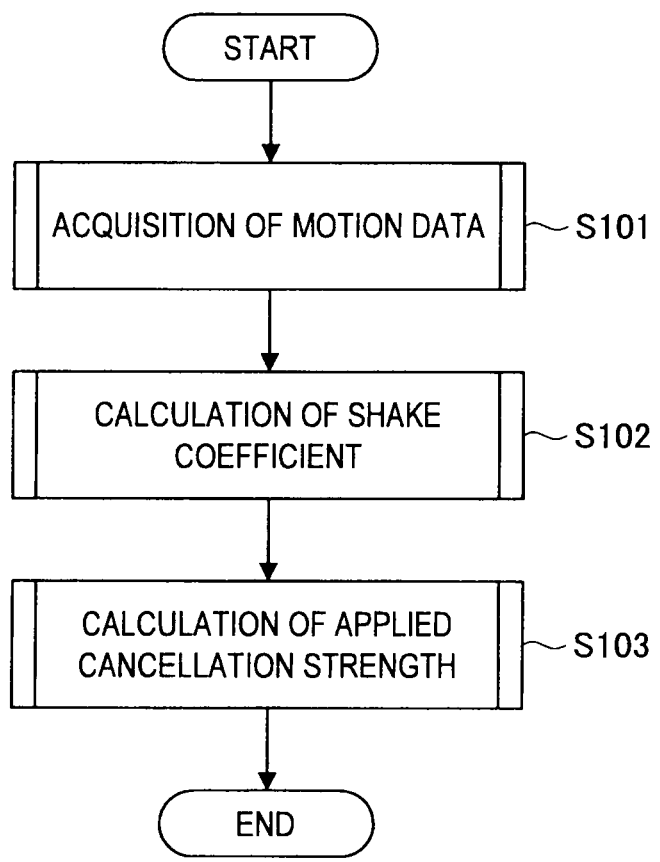
FIG. 2 is an explanatory diagram for describing an operation of a state detection unit forming the portable appliance according to the embodiment.

Next, the explanation regarding the operation of the state detection unit 115 will be supplemented with reference to FIG. 2. FIG. 2 is an explanatory diagram for describing a flow of processes by the state detection unit 115.

(1-2-1: Flow of Processes)

As shown in FIG. 2, the state detection unit 115 acquires motion data from the FIFO buffer 114 (S101). Then, the state detection unit 115 calculates a shake coefficient based on the motion data acquired in step S101 (S102). Next, the state detection unit 115 calculates applied cancellation strength based on the shake coefficient calculated in step S102 (S103).

(1-2-2: Calculation Method of Shake Coefficient)

The calculation method of the shake coefficient s in step S102 will be described here. Additionally, it is assumed that motion data ($D_t, \ldots, D_{t+n}$) is acquired by the state detection unit 115 in step S101. The shake coefficient s is a numerical value expressing the intensity of motion expressed by the motion data ($D_t, \ldots, D_{t+n}$). The intensity of motion can be expressed by the intensity of a high-frequency component. Thus, the state detection unit 115 Fourier transforms the motion data ($D_t, \ldots, D_{t+n}$) and calculates frequency data, and uses the amplitude of the high-frequency component. For example, the state detection unit 115 calculates a maximum amplitude value in a predetermined frequency domain, among the frequency data, as the shake coefficient s.

(1-2-3: Calculation Method of Applied Cancellation Strength)

Next, the calculation method of the applied cancellation strength in step S103 will be described.

(Case where Only Two States are Taken into Account)

As shown in FIG. 3, in the case of taking only two cases into account, namely a case where cancellation is to be applied and a case where cancellation is not to be applied, the state detection unit 115 calculates the applied cancellation strength based on comparison results between the shake coefficient s and two thresholds $T_1$ and $T_2$. Additionally, the applied cancellation strength is 1.0 in the case of a cancellation-applied state. On the other hand, the applied cancellation strength is 0.0 in the case of a non-cancellation-applied state.

As described above, in the case the shake coefficient s is large, the shaking of the portable appliance 10 is intense. In the case the shaking of the portable appliance 10 is intense, if image data is moved in a direction of cancelling the shaking, the shaking of the image data relative to a user's gaze point is not reduced, but on the contrary, the shaking of the image data relative to the user's gaze point is possibly increased, due to a delay resulting from computational processing or the like. Furthermore, if the image data is greatly moved, much of the image area will move out of the screen and a non-displayed area of the image data will be too large. Thus, cancellation of shaking is preferably not applied in the case the shaking of the portable appliance 10 is intense.

On the other hand, in the case the shake coefficient s is small, the shaking of the portable appliance 10 is slow. In the case the shaking of the portable appliance 10 is slow, a user can follow the motion of the image data without becoming tired. Thus, no cancellation is necessary in the case the shake coefficient s is small.

For the above reason, thresholds $T_1$ and $T_2$ are preferably determined as follows. For example, with respect to threshold $T_1$, the range of the shaking indicated by the shake coefficient s is about 1% of the screen size. That is, threshold $T_1$ is set to be a value according to which the shaking of the image data relative to the user's gaze point will be negligible. On the other hand, with respect to threshold $T_2$, the range of the shaking indicated by the shake coefficient s is about 10% of the screen size. That is, it is set to be a value according to which, in the case cancellation has been applied, the effect of cancellation is obtained and the non-displayed area is not too large. Additionally, the numerical values of thresholds $T_1$ and $T_2$ are not limited to the examples described above. Also, thresholds $T_1$ and $T_2$ may be fixed values, or they may be variable.

(Case where Applied Cancellation Strength is Continuous Value)

Furthermore, a method of continuously determining the applied cancellation strength according to the shake coefficients s is also conceivable. For example, the applied cancellation strength can be defined by a real number between 0.0 and 1.0, as shown in FIG. 4. At this time, the non-cancellation-applied state is defined to be a state where the applied cancellation strength is 0.0. According to the characteristic curve of the applied cancellation strength illustrated in FIG. 4, the applied cancellation strength is increased or decreased smoothly along with the increase in the shake coefficient s. But the characteristic of the applied cancellation strength is not limited to such. For example, it may be a characteristic according to which the applied cancellation strength linearly increases from shake coefficient $s_1$, and after reaching applied cancellation strength of 1.0 at shake coefficient $s_2$ ($s_2 > s_1$), linearly decreases from shake coefficient $s_3$ ($s_3 > s_2$).

In the foregoing, an operation of the state detection unit 115 has been described.

[1-3: Operation of Filter Unit 117]

Figure 5:
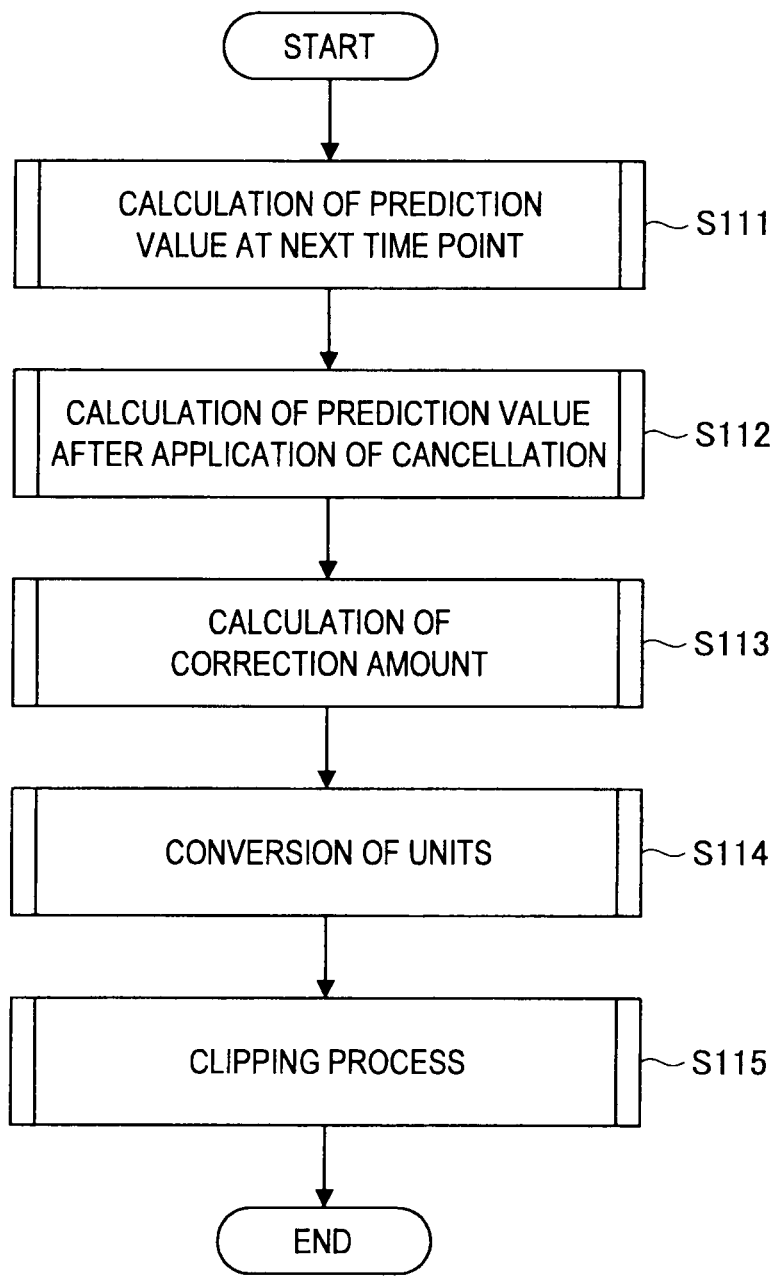
FIG. 5 is an explanatory diagram for describing an operation of a filter unit forming the portable appliance according to the embodiment.

Next, the explanation regarding the operation of the filter unit 117 will be supplemented with reference to FIG. 5. FIG. 5 is an explanatory diagram for describing a flow of processes by the filter unit 117.

(1-3-1: Flow of Processes)

As shown in FIG. 5, the filter unit 117 predicts motion data (prediction value; see FIG. 6) at a display time point of a next frame based on the motion data read from the FIFO buffer 114 (S111). Next, the filter unit 117 applies motion data including the prediction value to a predetermined filter and calculates a prediction value after application of cancellation (S112). Then, the filter unit 117 deducts the prediction value before application of filter from the prediction value after application of cancellation and calculates a correction amount (see FIG. 7) (S113).

Then, the filter unit 117 converts the unit of the correction amount from the unit of motion data (inch or the like) to the unit of image data (pixel) (S114). Next, the filter unit 117 re-sets the correction amount based on a maximum screen movement amount as shown in FIG. 9 or 10 (clipping process) (S115). For example, in the case the correction amount is above the maximum screen movement amount, the maximum screen movement amount is set to the new correction amount, and in the case the correction amount is not above the maximum screen movement amount, the correction amount calculated in step S114 is maintained.

(1-3-2: Calculation of Prediction Value)

The calculation method of the prediction value of step S111 will be described here.

As the calculation method of the prediction value, there is, for example, a linear prediction method using two adjacent samples ($D_{t+n-1}, D_{t+n}$), as shown in FIG. 6. According to this method, a straight line connecting the two adjacent samples ($D_{t+n-1}$, $D_{t+n}$) is extended, and motion data $D_{t+n+1}$ at the display time point t+n+1 of a next frame is predicted.

Furthermore, as the calculation method of the prediction value, a prediction method using a spline curve of motion data ($D_t, \ldots, D_{t+n}$) is also conceivable, for example. According to this method, a spline curve based on the motion data ($D_t, \ldots, D_{t+n}$) is calculated, and the motion data $D_{t+n+1}$ is predicted by extending the spline curve to the display time point t+n+1 of a next frame.

(1-3-3: Calculation of Correction Amount)

Next, the calculation method of the correction amount of steps S112 and S113 will be described.

At the time of calculating the correction amount, an interpolated line after filter application is first calculated as shown in FIG. 7. This interpolated line after filter application is an output value of a filter to which motion data ($D_t, \ldots, D_{t+n}$ $D_{t+n+1}$) including the prediction value has been applied. The interpolated line after filter application corresponds to a shaking state where shaking of the image data relative to a user's gaze point is suppressed. That is, the filter applied data at the display time point t+n+1 of the next frame corresponds to the prediction value of motion data which will be obtained after application of cancellation. Thus, the filter unit 117 which has obtained the filter applied data sets the difference between the filter applied data at the display time point t+n+1 of the next frame and prediction value $D_{t+n+1}$ as the correction amount.

(1-3-4: Determination Method of Protected Area and Maximum Screen Movement Amount)

Next, referring to FIGS. 9 and 10, a determination method of the protected area and the maximum screen movement amount of the image data will be described in relation to the clipping process of step S115.

(Configuration for Protecting Protected Area)

Image data includes an area that is desired to be displayed within the screen. Accordingly, this area will be set as the protected area. For example, in the case the portable appliance 10 is an eBookReader, an area in which the body text is placed or the like is set as the protected area. Also, in the case the portable appliance 10 is a portable game machine, an area displaying the main character whose role a user is assuming or the like is set as the protected area. To display the protected area within the screen, it would suffice if the distance between the boundary of the protected area and the image frame is 0 or more after application of cancellation of shaking. Therefore, it is adequate if the distance between the boundary of the protected area and the image frame at a present time is set to the maximum screen movement amount. Also, it is adequate if the correction amount does not exceed the maximum screen movement amount. Thus, in the case the correction amount exceeds the maximum screen movement amount, the filter unit 117 re-sets the correction amount to the maximum screen movement amount.

(Configuration for Displaying Image Data on Entire Screen)

There may be image data that is larger than the screen size. For example, a background image or the like of a game is sometimes set to be larger than the screen size. Also, it is sometimes desired that the image data is displayed on the entire screen. In such a case, the maximum screen movement amount is determined not by the distance between the boundary of the protected area and the image frame but by the distance between the boundary of the image data and the image frame. As shown in FIG. 10, if the maximum screen movement amount is determined by the distance between the boundary of the protected area and the image frame, the maximum screen movement amount will be as B. On the other hand, if the maximum screen movement amount is determined by the distance between the boundary of the image data and the image frame, the maximum screen movement amount will be as A.

If cancellation of shaking is applied based on the maximum screen movement amount B, an area on which the image data is not displayed may possibly be included in a part of the screen. In contrast, when cancellation of shaking is applied based on the maximum screen movement amount A, there is no possibility that an area on which the image data is not displayed will be included in a part of the screen. Therefore, in a case the image data is desired to be displayed on the entire screen, the maximum screen movement amount is determined to be A. Then, if the correction amount is larger than this maximum screen movement amount A, the correction amount is re-set based on the maximum screen movement amount A. By determining the maximum screen movement amount in this manner, it becomes possible to apply cancellation of shaking while displaying the image data on the entire screen.

In the foregoing, an operation of the filter unit 117 has been described.

In the foregoing, the first embodiment of the present invention has been described. The feature of the present embodiment lies in the method of calculating applied cancellation strength based on a shake coefficient s and performing cancellation of shaking based on the applied cancellation strength. By adopting this method, a user's fatigue can be reduced even if the portable appliance 10 is moved due to shaking of the hand or the like.

2: Second Embodiment

Next, a second embodiment of the present invention will be described. The present embodiment relates to a method of determining filter strength according to the use of a layer.

[2-1: Functional Configuration of Portable Appliance 10]

First, a functional configuration of the portable appliance 10 according to the present embodiment will be described with reference to FIG. 13. FIG. 13 is an explanatory diagram for describing a functional configuration of the portable appliance 10 according to the present embodiment. Additionally, structural elements that have substantially the same function as those of the portable appliance 10 according to the first embodiment above will be denoted with the same reference numerals, and detailed explanation of these structural elements will be omitted.

Figure 13:
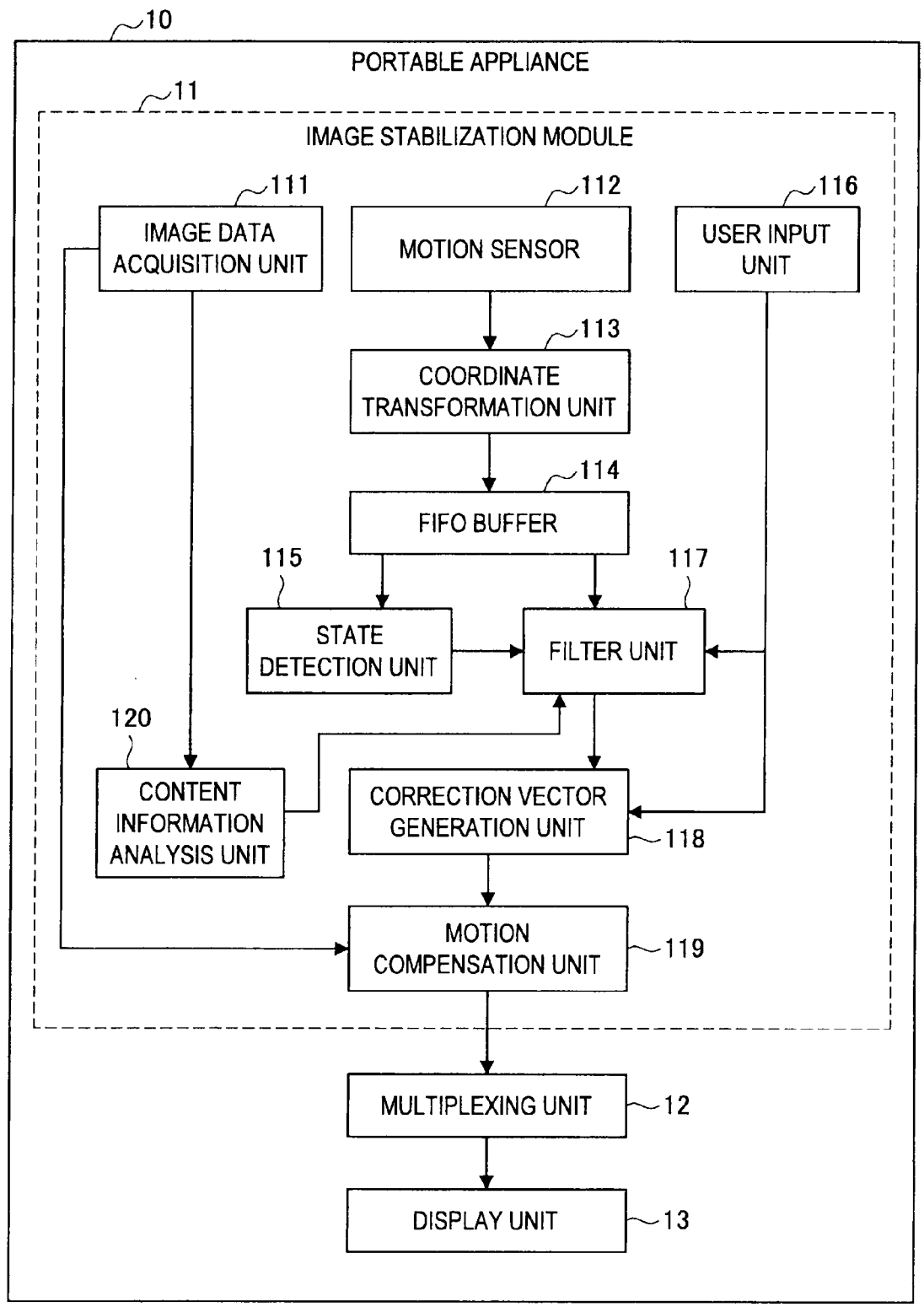
FIG. 13 is an explanatory diagram for describing a functional configuration of a portable appliance according to a second embodiment of the present invention.

As shown in FIG. 13, the portable appliance 10 mainly includes an image stabilization module 11, a multiplexing unit 12, and a display unit 13. The image stabilization module 11 is means for reducing shaking of a display image relative to a user's gaze point. The multiplexing unit 12 is means for multiplexing a plurality of layers and creating a display image. The display unit 13 is means for displaying the display image created by the multiplexing unit 12. The feature of the portable appliance 10 according to the present embodiment lies mainly in the configuration of the image stabilization module 11. Thus, in the following, the configuration of the image stabilization module 11 will be described in greater detail.

As shown in FIG. 13, the image stabilization module 11 mainly includes an image data acquisition unit 111, a motion sensor 112, a coordinate transformation unit 113, a FIFO buffer 114, and a state detection unit 115. Furthermore, the image stabilization module 11 includes a user input unit 116, a filter unit 117, a correction vector generation unit 118, a motion compensation unit 119, and a content information analysis unit 120. The main difference to the image stabilization module 11 according to the first embodiment above lies in the presence of the content information analysis unit 120. Thus, the content information analysis unit 120 will be described in detail.

(Content Information Analysis Unit 120)

Image data is input to the content information analysis unit 120 from the image data acquisition unit 111. When the image data is input, the content information analysis unit 120 analyses the input image data, and identifies the use of each layer forming the image data. Then, the content information analysis unit 120 assigns a filter strength weighting coefficient to each layer according to the identified use of the layer, and inputs the assigned filter strength weighting coefficient to the filter unit 117. The filter strength weighting coefficient is set in advance for each use, as shown in FIG. 14. Also, the filter strength weighting coefficient is used at the time of determining, by the filter unit 117, the tap length of a filter. For example, in the case the filter strength weighting coefficient is large, the tap length of a filter is set to be long, and in the case the filter strength weighting coefficient is small, the tap length of the filter is set to be short.

In the foregoing, a functional configuration of the portable appliance 10 has been described.

[2-2: Determination Method of Filter Strength]

Now, a concrete method of determining the filter strength will be described with reference to FIG. 14. FIG. 14 is an explanatory diagram showing an example configuration of a concrete filter strength weighting coefficient.

As described above, according to the present embodiment, the filter strength is determined according to the use of each layer. The magnitude of the filter strength weighting coefficient illustrated in FIG. 14 is what determines this filter strength. For example, filter strength weighting coefficient 1 is set for a layer for video. Also, filter strength weighting coefficient 3 is set for a layer for texts. Furthermore, filter strength weighting coefficient 0 is set for a layer for attribute information display. Accordingly, in the case of the setting illustrated in FIG. 14, the motion of the layer for texts is controlled in such a way that shaking is strongly cancelled relative to a user's gaze point. On the other hand, no cancellation is applied to the layer for attribute information display. In this way, the filter strength is determined according to the use of a layer and the application strength of cancellation is controlled.

In the foregoing, the determination method of filter strength has been described.

In the foregoing, the second embodiment of the present invention has been described. With the application strength of cancellation being adjusted according to the use of a layer as in the present embodiment, control of shake cancelling appropriate for information whose shaking relative to a user's gaze point is desired to be strongly suppressed and control appropriate for information which is desired to follow the motion of the portable appliance 10 are made possible. As a result, the user's visibility can be improved.

3: Third Embodiment

Next, a third embodiment of the present invention will be described. The present embodiment relates to a method of switching between a scaling state and a non-scaling state described later.

[3-1: Functional Configuration of Portable Appliance 10]

Figure 15:
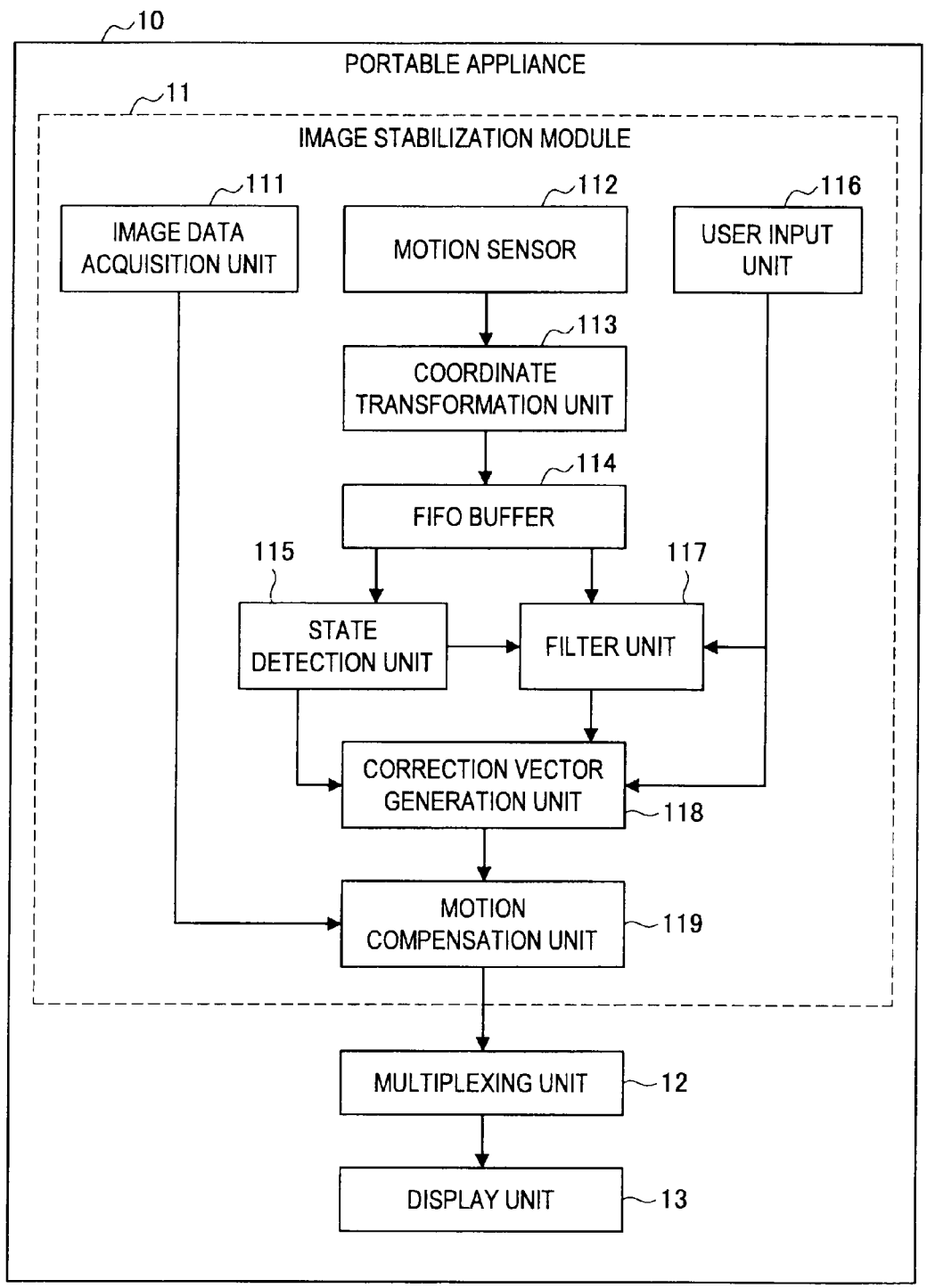
FIG. 15 is an explanatory diagram for describing a functional configuration of a portable appliance according to a third embodiment.

First, a functional configuration of a portable appliance 10 according to the present embodiment will be described with reference to FIG. 15. FIG. 15 is an explanatory diagram for describing a functional configuration of a portable appliance 10 according to the present embodiment. Additionally, structural elements that have substantially the same function as those of the portable appliance 10 according to the first embodiment above will be denoted with the same reference numerals, and detailed explanation of these structural elements will be omitted.

As shown in FIG. 15, the portable appliance 10 mainly includes an image stabilization module 11, a multiplexing unit 12, and a display unit 13. The image stabilization module 11 is means for reducing shaking of a display image relative to a user's gaze point. The multiplexing unit 12 is means for multiplexing a plurality of layers and creating a display image. The display unit 13 is means for displaying the display image created by the multiplexing unit 12. The feature of the portable appliance 10 according to the present embodiment lies mainly in the configuration of the image stabilization module 11. Thus, in the following, the configuration of the image stabilization module 11 will be described in greater detail.

As shown in FIG. 15, the image stabilization module 11 mainly includes an image data acquisition unit 111, a motion sensor 112, a coordinate transformation unit 113, a FIFO buffer 114, and a state detection unit 115. Furthermore, the image stabilization module 11 includes a user input unit 116, a filter unit 117, a correction vector generation unit 118, and a motion compensation unit 119. The main difference to the image stabilization module 11 according to the first embodiment above lies in that the applied cancellation strength calculated by the state detection unit 115 is input to the correction vector generation unit 118, as well as in a function of the correction vector generation unit 118. Thus, the function of the correction vector generation unit 118 will be described in detail.

(Correction Vector Generation Unit 118)

As has been described, the correction vector generation unit 118 is means for generating a correction vector for correcting the position of a layer by using a correction amount input from the filter unit 117. The correction vector generation unit 118 according to the first embodiment described above expressed the correction matrix V by using matrices M, P, and C indicating rotation, translation, movement of origin, conversion of aspect ratio, or the like. On the other hand, the correction vector generation unit 118 according to the present embodiment distinguishes between a scaling state and a non-scaling state described later, and expresses the correction vector V by including therein matrix S indicating the scaling indicated by formula (9) below (see formula (10) below).

[Equation 4]

$$S = \begin{pmatrix} s & 0 & 0 \\ 0 & s & 0 \\ 0 & 0 & 1 \end{pmatrix} \quad (9)$$

$$V = SC^{-1}P^{-1}MPC \quad (10)$$

The scaling mentioned above is to perform motion compensation by using the correction matrix V expressed by formula (10) above to which the matrix S has been applied. On the other hand, the non-scaling mentioned above is to perform motion compensation by using the correction matrix V according to the first embodiment described above. The decision of whether scaling is to be applied or not is performed in a manner described below.

Figure 16:
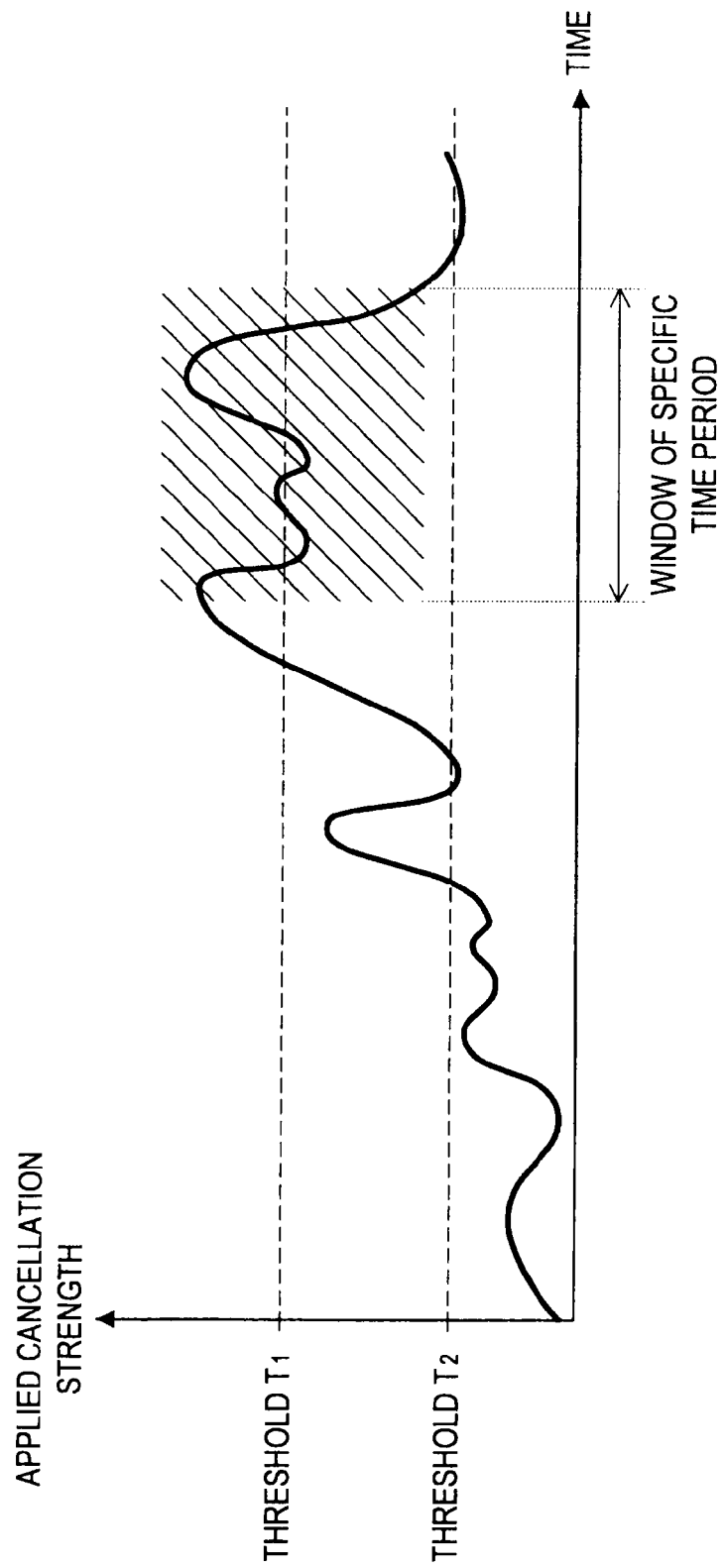
FIG. 16 is an explanatory diagram for describing a shake cancelling method according to the embodiment.

First, as shown in FIG. 16, the correction vector generation unit 118 accumulates, over a specific period of time, the applied cancellation strength input by the state detection unit 115. Next, the correction vector generation unit 118 decides whether, of the applied cancellation strengths accumulated over a specific period of time, the number of values exceeding threshold $T_1$ is larger than a predetermined number or not. When the number of applied cancellation strengths exceeding threshold $T_1$ is larger than the predetermined number, the correction vector generation unit 118 starts application of scaling. The correction vector generation unit 118 decides in a similar manner whether, of the applied cancellation strengths accumulated over the specific period of time, the number of values exceeding threshold $T_2$ is larger than a predetermined number or not. When the number of applied cancellation strengths exceeding threshold $T_2$ is less than the predetermined number, the correction vector generation unit 118 ends the application of scaling.

In the foregoing, a functional configuration of the portable appliance 10 has been described.

In the foregoing, the third embodiment has been described. By adopting the configuration of the present embodiment, the motion of a viewing target can be reduced so as not to tire a user, and the visibility can be improved.

4: Hardware Configuration

Figure 17:
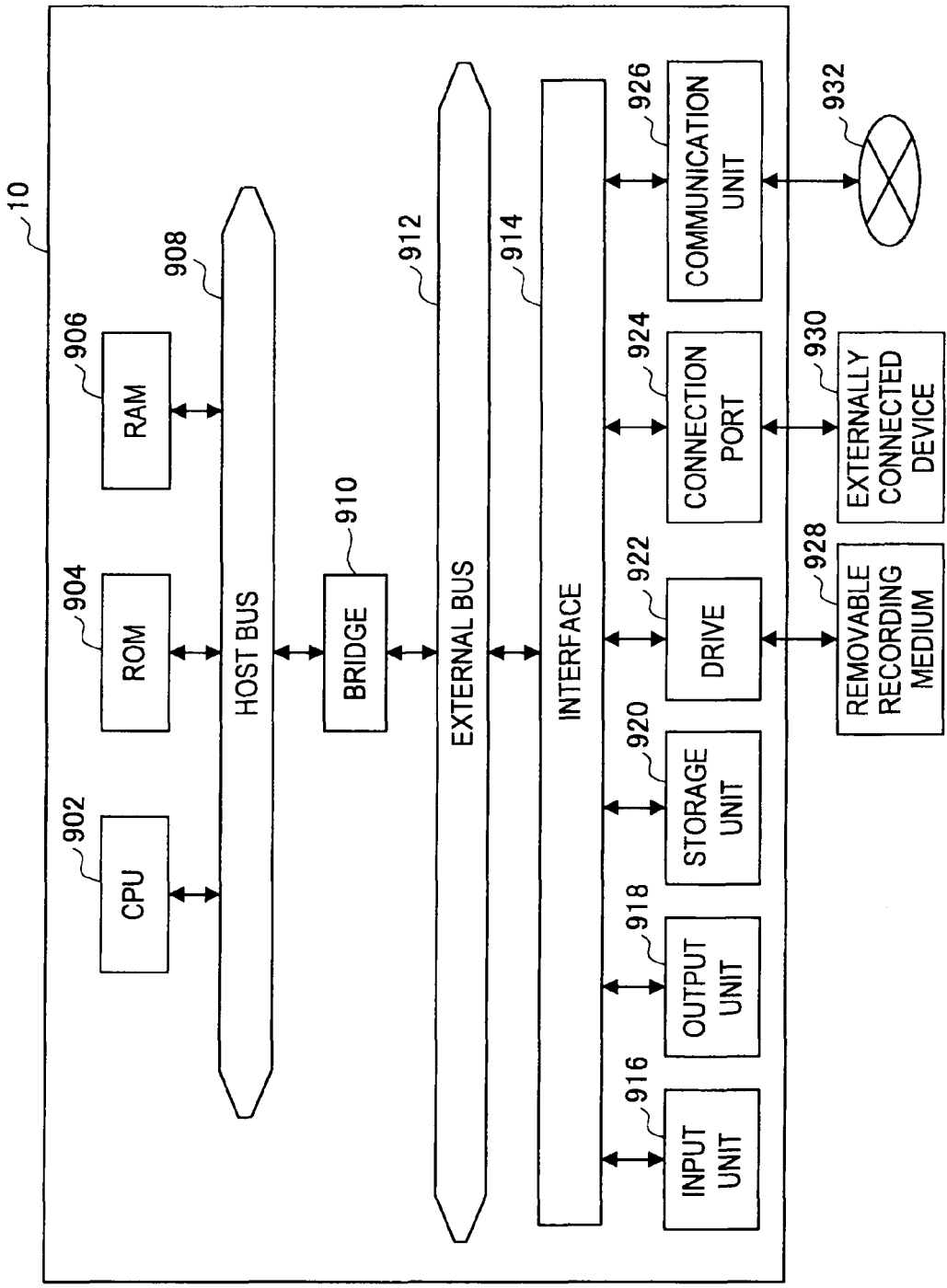
FIG. 17 is an explanatory diagram for describing a hardware configuration capable of realizing functions of the portable appliances according to the first to third embodiments of the present invention.

The function of each structural element of the portable appliance 10 described above can be realized by using, for example, the hardware configuration of an information processing apparatus illustrated in FIG. 17. That is, the function of each structural element can be realized by controlling the hardware shown in FIG. 17 using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 17, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

5: Summary

Lastly, the technical contents according to the embodiment of the present invention will be briefly described. The technical contents stated here can be applied to various information processing apparatuses, such as a personal computer, a mobile phone, a portable game machine, a portable information terminal, an information appliance, a car navigation system, and the like.

The functional configuration of the information processing apparatus described above can be expressed as follows. The information processing apparatus includes a motion sensor, an image data display unit, a shake coefficient calculation unit, and a motion correction unit as below. The motion sensor is for detecting motion data. Also, the image data display unit is for displaying image data. The shake coefficient calculation unit is for calculating a shake coefficient indicating intensity of shaking based on time-series motion data detected by the motion sensor. For example, the shake coefficient calculation unit refers to a high-frequency component of the motion data, and calculates the maximum amplitude value of the high-frequency component as the shake coefficient.

Furthermore, the motion correction unit is for performing control on the image data display unit, in a case the shake coefficient calculated by the shake coefficient calculation unit becomes less than a predetermined first threshold, to move the image data in a direction of cancelling the shaking. For example, it causes the process of cancelling the shaking to be not performed in a case where, if the image data is moved in a direction of cancelling the shaking, the motion of the image data will not be able to follow the motion of the apparatus and intense shaking that will disturb the visibility of the image data will be caused (a case where the shake coefficient is above the predetermined first threshold). According to this configuration, the visibility can be prevented from being degraded by the cancellation of shaking, and the fatigue of the user can be reduced.

(Notes)

The display unit 13 is an example of an image data display unit. The state detection unit 115 is an example of a shake coefficient calculation unit. The state detection 115, the filter unit 117, the correction vector generation unit 118, and the motion compensation unit 119 are examples of a motion correction unit. The state detection unit 115 and the filter unit 117 are examples of a motion estimation unit and a cancellation degree determination unit. The filter unit 117 is an example of a maximum movement amount calculation unit. The image stabilization module 11 is an example of an image stabilization device.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-130437 filed in the Japan Patent Office on Jun. 7, 2010, the entire content of which is hereby incorporated by reference.

What is claimed is:

1. An image stabilization device comprising:
   a motion sensor that detects motion data of the image stabilization device;
   an image data display that displays image data; and
   a computer configured to:
      calculate a shake coefficient indicating intensity of shaking based on time-series motion data detected by the motion sensor, the shake coefficient being an amplitude value obtained in a predetermined frequency domain above a predetermined frequency threshold among the time-series motion data;
      perform control of the image data display, in a case that the shake coefficient is obtained in the predetermined frequency domain above the predetermined frequency threshold, and the shake coefficient calculated by the computer becomes less than a predetermined first threshold, to move an entire area of the image data in a direction of cancelling the shaking; and
      end the control to move the entire area of the image data in the direction of cancelling the shaking in a case that the shake coefficient calculated by the computer becomes less than a predetermined second threshold that is less than the predetermined first threshold.

2. The image stabilization device according to claim 1, wherein the computer performs control of moving the entire area of the image data in such a way that a degree of cancellation of the shaking gradually increases as the shake coefficient becomes less than the predetermined first threshold, and performs control of moving the entire area of the image data in such a way that the degree of cancellation of the shaking gradually decreases as the shake coefficient nears the predetermined second threshold.

3. The image stabilization device according to claim 2, wherein the computer performs control of moving the entire area of the image data within a range allowing display of a protected area set in the image data.

4. The image stabilization device according to claim 3, wherein the computer is configured to:
   calculate a maximum movement amount of the image data based on a relationship between a frame position of a display screen on which the image data is displayed and a frame position of the protected area; and
   perform control of moving the entire area of the image data within a range that does not exceed the maximum movement amount calculated by the circuitry computer.

5. The image stabilization device according to claim 4, wherein, when a predetermined time has elapsed in a state where the shake coefficient calculated by the computer is less than the predetermined first threshold, the computer performs the control of moving the entire area of the image data in the direction of cancelling the shaking after performing scaling on the image data.

6. The image stabilization device according to claim 3, wherein the image data is formed from a plurality of layers, wherein a different use is set for each layer,
   wherein a different degree of cancellation of the shaking is set for each use, and
   wherein the computer performs control of moving each layer forming the entire area of the image data according to the degree of cancellation of the shaking set for the use of each layer.

7. The image stabilization device according to claim 1, wherein the computer is configured to:
   estimate, from motion data detected by the motion sensor at present and in a past, motion data to be detected at a next time point;
   determine a degree of cancellation of the shaking based on the motion data estimated by the computer; and
   perform control of moving the entire area of the image data according to the degree of cancellation of the shaking determined by the computer.

8. The image stabilization device according to claim 1, wherein the image data is formed from a plurality of layers, wherein a different use is set for each layer,
   wherein a different degree of cancellation of the shaking is set for each use, and
   wherein the computer performs control of moving each layer forming the entire area of the image data according to the degree of cancellation of the shaking set for the use of each layer.

9. The image stabilization device according to claim 1, wherein, when a predetermined time has elapsed in a state where the shake coefficient calculated by the computer is less than the predetermined first threshold, the computer performs the control of moving the entire area of the image data in the direction of cancelling the shaking after performing scaling on the image data.

10. The image stabilization device according to claim 1, wherein the computer sets the predetermined first threshold so that a range of the shaking indicated by the shake coefficient when the shake coefficient is the predetermined first threshold is about 10% of a size of the entire area of the image data display, and the computer sets the predetermined second threshold so that a range of the shaking indicated by the shake coefficient when the shake coefficient is the predetermined second threshold is about 1% of the size of the entire area of the image data display.

11. The image stabilization device according to claim 1, wherein the computer does not perform the control of the image data display to move the entire area of the image data in the direction of cancelling the shaking in a case that the shake coefficient is not obtained in the predetermined frequency domain above the predetermined frequency threshold.

12. An image stabilization method of an image stabilization device, the image stabilization method comprising:
   detecting motion data of the image stabilization device;
   displaying image data;
   calculating, using a computer, a shake coefficient indicating intensity of shaking based on time-series motion data detected in the detecting, the shake coefficient being an amplitude value obtained in a predetermined frequency domain above a predetermined frequency threshold among the time-series motion data;
   moving, using the computer, an entire area of the image data displayed in the displaying in a direction of cancelling the shaking in a case that the shake coefficient is obtained in the predetermined frequency domain above the predetermined frequency threshold, and the shake coefficient calculated in the calculating becomes less than a predetermined first threshold; and
   ending, using the computer, the moving in a case that the shake coefficient calculated in the calculating becomes less than a predetermined second threshold that is less than the predetermined first threshold.

13. The image stabilization method according to claim 12, wherein the computer does not move the entire area of the image data displayed in the displaying in the direction of cancelling the shaking in a case that the shake coefficient is not obtained in the predetermined frequency domain above the predetermined frequency threshold.

14. A non-transitory computer readable medium including executable instructions, which when executed by a computer cause the computer to execute an image stabilization method of an image stabilization device, the image stabilization method comprising:
   detecting motion data of the image stabilization device;
   displaying image data;
   calculating a shake coefficient indicating intensity of shaking based on time-series motion data detected in the detecting, the shake coefficient being an amplitude value obtained in a predetermined frequency domain above a predetermined frequency threshold among the time-series motion data;
   moving an entire area of the image data in a direction of cancelling the shaking in a case that the shake coefficient is obtained in the predetermined frequency domain above the predetermined frequency threshold, and the shake coefficient calculated in the calculating becomes less than a predetermined first threshold; and
   ending the moving in a case that the shake coefficient calculated in the calculating becomes less than a predetermined second threshold that is less than the predetermined first threshold.

15. The non-transitory computer readable medium according to claim 14, wherein the entire area of the image data is not moved in the direction of cancelling the shaking in a case that the shake coefficient is not obtained in the predetermined frequency domain above the predetermined frequency threshold.

* * * * *